United States Patent [19]

Kanner

[11] Patent Number: 4,801,033
[45] Date of Patent: Jan. 31, 1989

[54] REUSABLE VIAL CAP

[75] Inventor: Rowland W. Kanner, Guntersville, Ala.

[73] Assignee: Ryder International Corporation, Arab, Ala.

[21] Appl. No.: 174,690

[22] Filed: Mar. 29, 1988

[51] Int. Cl.$^4$ .................... B65D 43/12; B65D 43/20
[52] U.S. Cl. ..................................... 215/322; 215/277
[58] Field of Search ................. 215/277, 322; 220/256

[56] References Cited

U.S. PATENT DOCUMENTS 2,436,297  2/1948  Guarnaschelli ................ 215/322
2,649,220  8/1953  Vastano et al. ................ 215/322
4,230,231 10/1980  Burnett et al. ................. 215/277

Primary Examiner—George T. Hall
Attorney, Agent, or Firm—Trexler, Bushnell, Giangiorgi & Blackstone, Ltd.

[57] ABSTRACT

A reusable cap for assuring the sealed seating of a stopper against the open end of a vial neck is provided with a unitary body of rigid material having a base which overlies the head of the resilient stopper and the open end of the vial neck. The base is provided with a plurality of downwardly extending ribs which seat against the resilient stopper head. A pair of jaw portions project downwardly from the base and peripherally grip the underside of a bead at the open end of the vial neck, so that the stopper head and vial neck bead are sealed and clamped between the ribs and the jaws. The resilience of the stopper surface beneath the ribs is utilized to accommodate variation in the thicknesses of the vial neck bead and stopper head as well as allowing for expansion of the stopper vial neck during the heating and cooling conditions of repeated sterilization cycles.

8 Claims, 1 Drawing Sheet

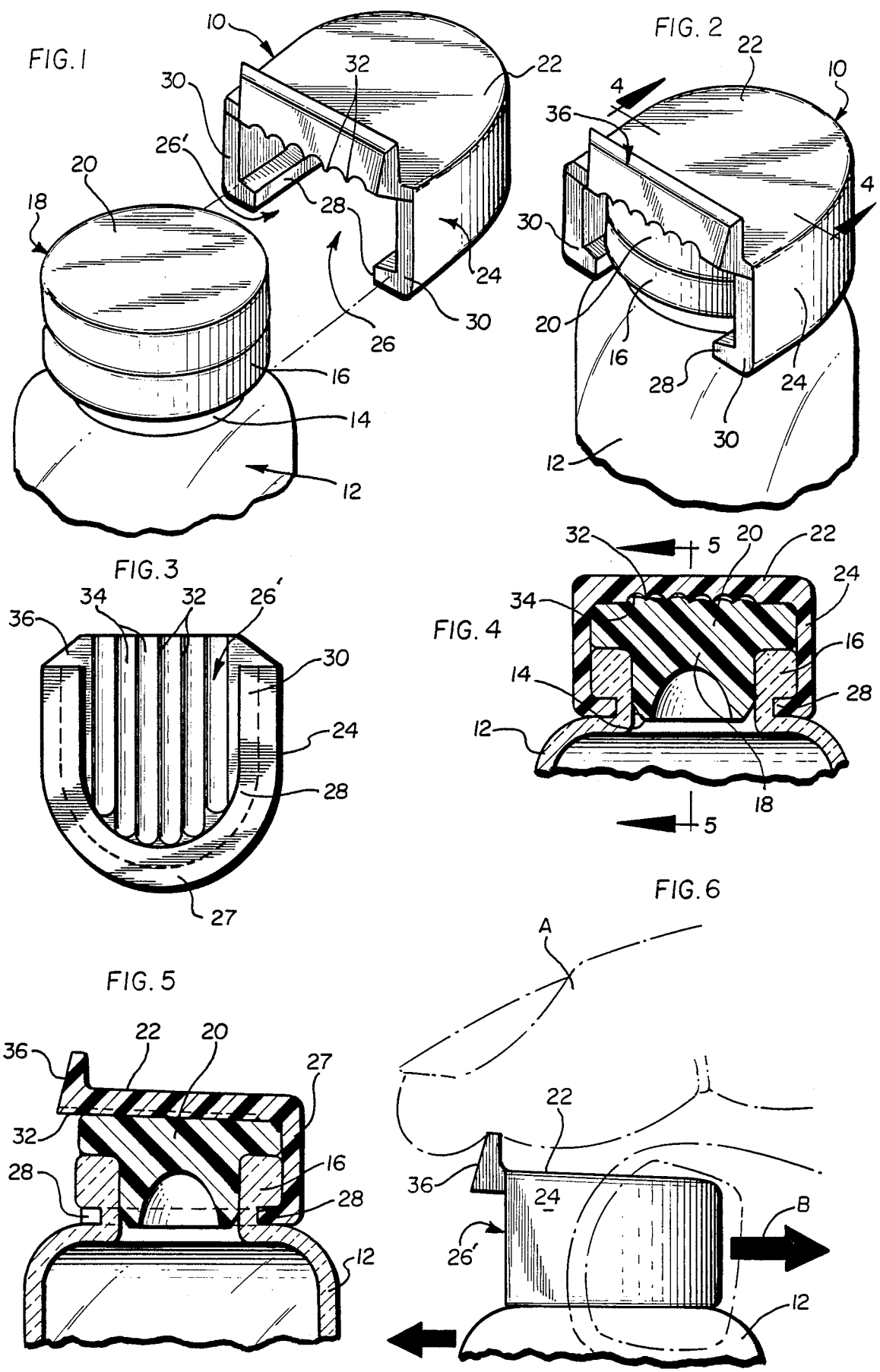

REUSABLE VIAL CAP

BACKGROUND OF THE INVENTION

This invention relates to improvements in container closures, and more particularly to a reusable cap for mounting on a seal closure or stopper inserted into the neck of a vial to retain the seal.

Reusable plastic containers or caps for retaining the seal of stoppers inserted into the neck of a vial have been developed particularly for reuse in contact lens fitting procedures. Large numbers of vials containing test or examination lenses must be repeatedly subjected to a high-temperature sterilization and disinfection cycle following each use of the contained examination lens employed in testing multiple patients. As a result, the retaining cap must be repeatedly mounted and dismounted on the stopper and vial neck, as well as subjected to heating and cooling in the sterilization operation. For example, U.S. Pat. No. 4,480,762 describes a reusable plastic cap for retaining the sealed closure on vial necks in which a molded cap of resilient material has a base overlying the seal closure or stopper inserted in the vial neck and has opposed jaws on the base for gripping bead on the vial neck; the base also includes a pair of gripper flanges for manual engagement to spread apart the jaws during the mounting or removal of the cap on the vial neck, and a locking bar which assists in retaining the jaws in locked position on the vial neck by holding the gripper flanges spread apart. In general the cap described in this patent was designed for use with a vial neck and stopper head of specific dimensions in order to ensure the sealed condition during the high-temperature disinfection operation.

The cap in accordance with the subject invention provides for accommodation of vial necks and stoppers having a variation in dimensions, and assures proper sealing without over stressing the cap and reducing its useful life particularly under cycled heating and cooling conditions.

SUMMARY OF THE INVENTION

In accordance with the subject invention a reusable cap for assuring the sealed seating of a stopper against the open end of a vial neck is provided with a unitary body of resilient material having a base which overlies the head of the stopper and the open end of the vial neck. The base is provided with a plurality of downwardly extending ribs which seat against the stopper's resilient head. A pair of jaw portions project downwardly from the base and peripherally grip the underside of a bead at the open end of the vial neck, so that the stopper head and vial neck bead are sealed and clamped between the ribs and the jaw portions. The resilience of the stopper at each point contacted by the ribs is utilized to accommodate variation in the thicknesses of the vial neck bead and stopper head as well as allowing for expansion of the stopper vial neck during the heating and cooling conditions of repeated sterilization cycles.

In a preferred embodiment the jaw portions extend into a union which defines the closed end of a U-shaped skirt member formed peripherally below the base. The opposing jaw portions form an open end of the U-shaped skirt through which the stoppered vial neck portion is inserted to clamp and mount the cap thereon. Preferably, the ribs are arranged in elongate, parallel alignment perpendicular to the open end of the skirt in order to reduce frictional resistance to the sliding engagement against the stopper head and create a linearly orienting force in both mounting and dismounting the cap thereon.

BRIEF DESCRIPTION OF THE DRAWING

FIG. 1 is a perspective view of one embodiment of the vial cap in accordance with the invention;

FIG. 2 is a perspective view of the cap mounted on the stoppered vial neck shown in FIG. 1;

FIG. 3 is a bottom plane view of the cap shown in FIGS. 1 and 2, and illustrating the aligned ribs on the underside of the base of the cap;

FIG. 4 is a sectional view taken along line 4—4 in FIG. 2, viewed in the indicated direction;

FIG. 5 is a sectional view taken along line 5—5 in FIG. 4, viewed in the indicated direction; and FIG. 6 is a side elevational view of the mounted cap of FIG. 2 further illustrating preferred positioning of the users fingers in order to manually remove the cap from the vial neck.

DESCRIPTION OF THE ILLUSTRATED EMBODIMENT

Referring in more detail to the drawing FIG. 1 illustrates a cap according to the invention designated generally by reference character 10 immediately prior to mounting of the cap on a vial 12. The vial has a cylindrical neck 14 which opens at an annular, radially outwardly projecting bead 16. The neck opening is sealed by an elastomeric plug or stopper 18 which has an enlarged head 20 seated against the upper surface of the bead 16.

The cap 10 is molded from a resilient but sturdy material such as polycarbonate (polysulfone now being used). The cap 10 includes a generally flat base 22 from which a downwardly extending peripheral wall forms a generally semi-annular or U-shaped skirt. The base 22 and skirt 24 define an interior cavity 26 which is open both below and at an opening side 26' of the U-shaped skirt 24. The lower end of a skirt 24, spaced from the base 22, is defined by a radially inwardly projecting foot 28; at the opening of 26' the skirt wall 24 and foot 28 form an opposing pair of jaw formations or portions 30; as best shown in FIG. 3, the jaw formations 30 extend to the generally closed side of the skirt 24 where they are integrally formed. Accordingly, the foot 28 is an inward, U-shaped flange.

The underside of the base 22 has a plurality of downwardly projecting, elongate ribs 32 which are aligned generally perpendicular to the plane of the opening 26'.

Referring again to FIGS. 1 and 2, the cap 10 is mounted by inserting the bead 16 and the stopper head 20 transversely through the cap opening 26' which causes a slight distension of the foot 28 and jaws 30 by the bead 16, as well as a slight local compression of the stopper head at those points contacted 37 the ribs 32 against the stopper head 20. When fully inserted so that the bead 16 and/or stopper head 20 are seated against the closed side of the skirt 27, the vial neck projects through the lower opening of the cavity 26 and the foot 28 is seated peripherally below the bead 16 so that the stopper head 20 and bead 16 are tightly clamped and sealed together between the foot 28 and the slightly compressed stopper head surface under the ribs 32.

The compression under the ribs 32 is moderated by the resiliency of the stopper head 20 and the spacing of the separating grooves 34. The resilience and variable compressibility of the stopper head 20 not only enables distributed, but highly localized pressure sealing the stopper head 20 against the bead without requiring entirely standardized dimensions thereof, but in addition, the localized engagement of the ribs against the stopper head 20 and the transverse alignment of the ribs enable reduced frictional resistance and a linearly oriented sliding engagement with the stopper head 20 during mounting or dismounting the cap. As best shown in FIG. 6, manual dismounting of the cap 10 is assisted by a finger engagement flange 36 extending generally upwardly from the cap base 22 and is aligned generally parallel to the cavity opening 26' in order to enable the user's digit A to apply removing force directed generally perpendicular to the opening 26' as indicated by the direction of the arrow B in opposition to the withdrawal motion of the vial 12.

In order to promote the sealing retention of the cap 10, the spacing of the ribs 32 and foot 28 is slightly tapered toward the closed end 27 as best shown in FIG. 5 so that the clamping force of the cap on the stopper head 20 and bead 16 is slightly greater at the rear of the fully inserted position within the cap. Additionally, the stoppers resilience beneath the ribs 32 is utilized to accommodates the expansion of the vial neck and bead 16 as well as the stopper head 20 during the high temperature sterilization cycles.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A reusable cap for sealing a vial or the like including a neck portion having a generally resilient stopper inserted therein to close the open end of the vial neck portion, said cap comprising: a body of material having a base extending in generally parallel overlying relationship to the open end of the vial neck portion, said base including a plurality of downwardly projecting rib members for seating against said stopper member, and a pair of opposed jaw portions formed integral with said body, said jaw portions projecting from said base for gripping the radially outward periphery of said neck portion in order to clamp said stopper and neck portion between said ribs and each of said jaw portion and to maintain sealing of the stopper against the open end of the vial neck.

2. The cap according to claim 1 wherein said ribs are formed in spaced, parallel elongate configuration.

3. The cap according to claim 1 wherein said jaw portions extend into a union thereof defining the closed end of a U-shaped skirt member formed below said base.

4. The cap according to claim 1 wherein said cap includes at least one opening extending generally transversely between said jaw portions and below said ribs in order to enable slidable insertion of said stopper and neck portion through said opening to mount said cap thereon.

5. The cap according to claim 4 further comprising a finger flange projecting upwardly from said base to manually facilitate said slidable insertion and correspondingly slidable withdrawal of said stopper and neck from said opening to remove said cap.

6. The cap according to claim 5 wherein said finger flange comprises a digital engagement surface located adjacently above one end of said jaw portions.

7. The cap according to claim 6 wherein said engagement surface laterally extends generally transversely between said opposing jaw portions.

8. The cap according to claim 6 wherein said engagement surface extends generally transversely in relation to the elongate dimension of said ribs.

* * * * *